United States Patent
Pelkonen

(10) Patent No.: US 6,671,193 B1
(45) Date of Patent: Dec. 30, 2003

(54) POWER SOURCE AND ARRANGEMENT FOR RESTRICTING THE SHORT-CIRCUIT CURRENT OR RECTIFIER

(75) Inventor: Seppo Pelkonen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/031,194

(22) PCT Filed: Jul. 19, 2000

(86) PCT No.: PCT/FI00/00654
§ 371 (c)(1),
(2), (4) Date: Jan. 15, 2002

(87) PCT Pub. No.: WO01/06629
PCT Pub. Date: Jan. 25, 2001

(30) Foreign Application Priority Data

Jul. 19, 1999 (FI) .................................................. 991620

(51) Int. Cl.[7] .............................................. H02H 7/125
(52) U.S. Cl. ........................... 363/53; 363/127; 363/89; 363/26; 363/21.06; 361/93.1
(58) Field of Search ........................ 363/15, 16, 21.06, 363/21.14, 24, 25, 26, 56.05, 56.07, 89, 126, 127, 52, 53; 361/93.1

(56) References Cited

U.S. PATENT DOCUMENTS

| | | | |
|---|---|---|---|
| 4,870,555 A | * | 9/1989 | White ........................ 363/127 |
| 5,724,235 A | | 3/1998 | Shimamori et al. ........... 363/21 |
| 5,726,869 A | * | 3/1998 | Yamashita et al. ....... 363/21.06 |
| 6,069,802 A | * | 5/2000 | Priegnitz ..................... 323/907 |

FOREIGN PATENT DOCUMENTS

| | | | |
|---|---|---|---|
| DE | 43 15 906 A1 | 11/1994 | ............ H02M/3/28 |
| EP | 0 741 447 A2 | 11/1996 | .......... H02M/7/217 |

* cited by examiner

Primary Examiner—Michael Sherry
Assistant Examiner—Gary L. Laxton
(74) Attorney, Agent, or Firm—Cohen, Pontani, Lieberman & Pavane

(57) ABSTRACT

A power source with an arrangement for restricting short-circuit current includes at least a primary-side switch block, a transformer unit and a rectifier. The rectifier includes switching transistors for rectifying the secondary side of the transformer. Operation of the rectifier depends on a control from a pulse-forming part of the primary-side switch block. Control for the switching transistors in the rectifier is interrupted when the output current of the rectifier exceeds a limit value. At least one other switch element is arranged parallel to each of the switching transistors in the rectifier to realize a secondary-side rectification in an overload situation.

9 Claims, 4 Drawing Sheets

POWER SOURCE AND ARRANGEMENT FOR RESTRICTING THE SHORT-CIRCUIT CURRENT OR RECTIFIER

PRIORITY CLAIM

This is a U.S. national stage of application No. PCT/FI00/00654, filed on Jul. 19, 2000. Priority is claimed on that application and on the following application: Country: Finland, Application No.: 991620, Filed: Jul. 19, 1999.

FIELD OF THE INVENTION

The invention relates to a power source comprising an arrangement for restricting a short-circuit current. A power source according to the invention includes a primary-side switch block, transformer unit and a rectifier which comprises at least one switching transistor. The invention further relates to a method for restricting the short-circuit current in a power source comprising a primary-side switch block, transformer unit and a rectifier which comprises at least one switching transistor.

DESCRIPTION OF THE PRIOR ART

There are known power sources which include an arrangement for restricting a short-circuit current. In one arrangement, current is switched off by a transistor on the basis of a rise in the voltage across a sensing resistor.

From the prior art we further know of galvanically isolated power sources producing a d.c. voltage from a battery. Such power sources are utilized at least in connection with fixed telecommunication network equipment. A simple Buck switcher as well as flyback and forward converters are known. The most common of these is perhaps the forward converter. It uses switching transistors to periodically switch off the current or reverse its polarity at the primary winding of an isolation transformer, and a rectifier to rectify the current generated at the secondary winding. Rectification is realized by a passive diode construction or by synchronous switching transistors.

In closer examination, a synchronous forward converter includes a switcher for switching the d.c. voltage of the battery into a variable-polarity voltage for the primary winding of the isolation transformer, and a rectifier for switching, synchronized with the switcher, the a.c. voltage obtained from the secondary winding of the isolation transformer back into a single-polarity voltage which is rectified by an inductance-capacitance connection. The switcher in the power source mainly consists of a pulse-width modulator and primary-side transistors controlled by the former. Similarly, the synchronous rectifier comprises secondary-side transistors controlled by a switch circuit which in turn is controlled by the pulse-width modulator. The control pulses of the pulse-width modulator are adjusted on the basis of the output signal of the whole switcher circuit, which output signal is fed back to the pulse-width modulator. The adjustment of pulses affects the switching state of the primary-side transistors in the isolation transformer. Restriction of possible short-circuit current is realized by shortening the switching pulses of the transistors used for connecting the d.c. voltage to the primary winding.

A problem with diode rectifiers of galvanically isolated power sources according to the prior art is the considerable amount of power required by the diodes, which could be, for example, about 9% of the transmitted power in cases where the output voltage is less than 3.3 volts.

Another problem with galvanically isolated power sources according to the prior art and with their synchronous rectifiers is the large short-circuit current in the output conductors. The largeness of the current is mainly due to the lower pulse width limit of the pulse-width modulator controlling the transistors which provide input to the primary winding of the isolation transformer. This lower limit causes a minimum coupling to the isolation transformer, and the current thus generated at the secondary winding is further conducted to the power source output in half cycles. When the output of the rectifier in the power source is shorted the current increases significantly at the secondary side and may result in damages to components and even to the circuit board. If the damaged sub-entity is an essential part of the device, the unit must be replaced. Momentary accidental short circuits may occur when installing devices.

SUMMARY OF THE INVENTION

An object of the invention is to provide a power source and method for restricting a short-circuit current, which power source comprises a primary-side switch block, transformer unit and a rectifier which includes at least one switching transistor.

A power source according to the invention with an arrangement for restricting the short-circuit current and comprising a primary-side switch block, transformer unit and a rectifier which includes at least one switching transistor is characterized in that the control for the at least one switching transistor in the rectifier is arranged so as to be cut off in an overload situation, and the rectifier comprises at least one switch element connected in parallel with the switching transistor, whereby rectification at the secondary side is arranged so as to be realized in an overload situation by means of the said switch element.

The method according to the invention for restricting the short-circuit current of a power source comprising a primary-side switch block, transformer unit and a rectifier including at least one switching transistor is characterized in that the control for the said at least one switching transistor is cut off in an overload situation, and rectification at the secondary side is realized in an overload situation substantially by means of at least one switch element connected in parallel with the secondary-side switching transistor.

Advantageous embodiments according to the invention are specified in the dependent claims.

In the arrangement according to the invention for restricting the short-circuit current in a synchronous rectifier there are, connected in parallel with the switching transistors of the secondary winding, diodes and a circuit that cuts off the control to the switching transistors in a short-circuit situation. The diodes can provide rectification in a short-circuit situation when the secondary-side switching transistors are non-conductive. Advantageously the output of the circuit includes an inductance whereby the pulse-width modulator and, further, the primary-side switching transistors can be controlled according to the output voltage.

The secondary-side switching transistor control cut-off is based on a variable-pulse-height current supply from the primary-side switching transistor control line through an amplifier, capacitor, isolation transformer and rectifier bridge. When the primary-side switching transistor control pulses remain low, the switch circuit controlling the secondary-side switching transistors will not get sufficient operating voltage but is turned off.

Return to normal operation is, however, automatic as the diodes according to the invention maintain, by means of inductance, control to the primary-side switching transistors, and when the short-circuit is removed the control returns to normal and the switch circuit of the secondary-side switching transistors begins functioning again. In normal operation, the diodes according to the invention are momentarily conductive as the status of the signal produced by the pulse-width modulator changes, whereafter, as the switching transistor goes into conduction, the current through the diodes is nearly zero when all the current flows through the transistor.

BRIEF DESCRIPTION OF THE DRAWINGS

The invention is described in detail in the following, with reference to the accompanying drawings in which.

Like elements in the drawings are denoted by like reference designators.

DESCRIPTION OF THE PREFERRED EMBODIMENTS OF THE INVENTION

Figure 1:
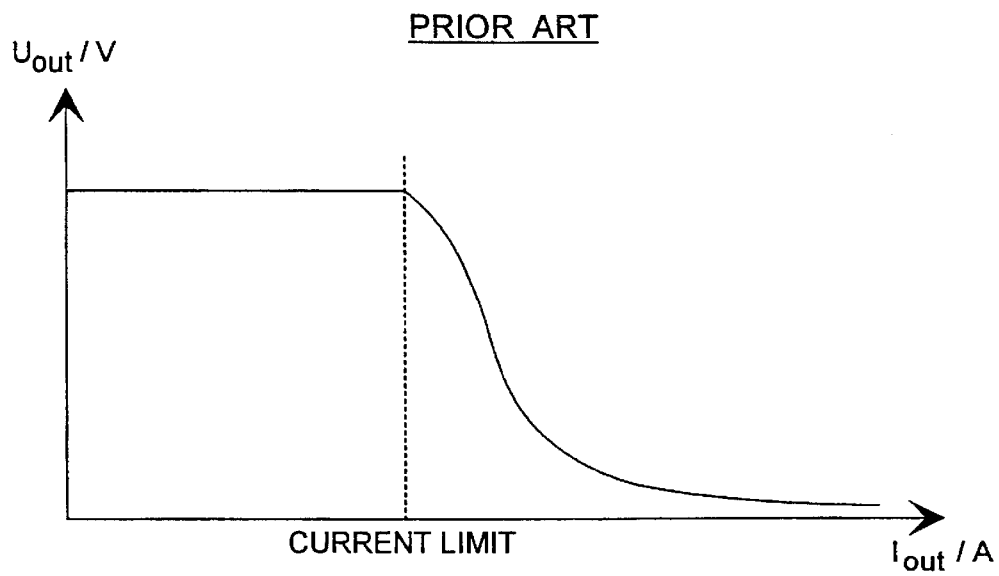
FIG. 1 shows a characteristic curve of a current-restricting arrangement according to the prior art.

FIG. 1 shows a characteristic curve of a current-restricting arrangement according to the prior art. The current limit on the horizontal axis is here also the power limit at which limiting starts as the current continues to increase.

Figure 2:
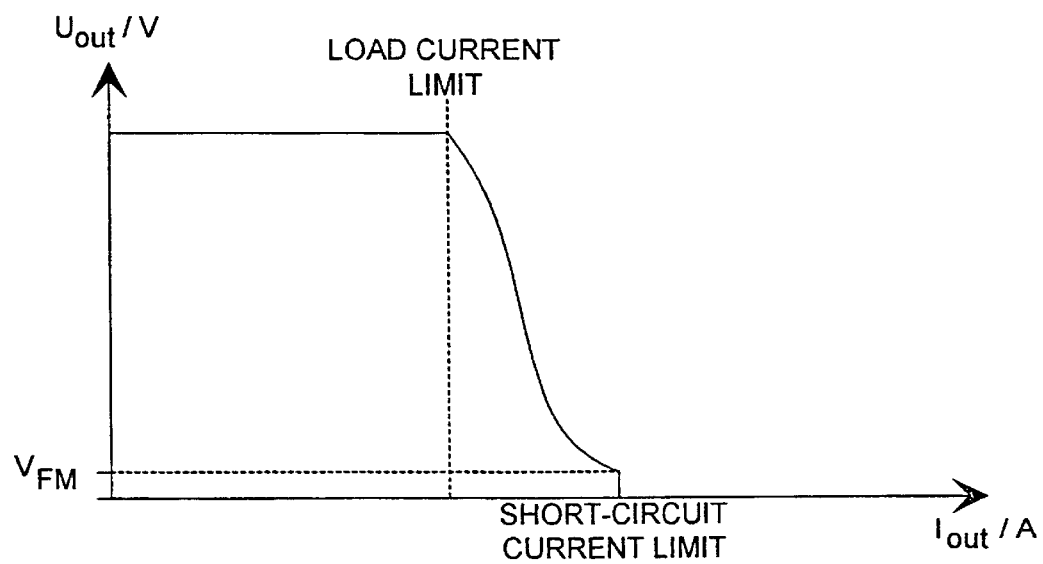
FIG. 2 shows a characteristic curve of a current-restricting arrangement according to the invention.

FIG. 2 shows a characteristic curve of a current-restricting arrangement according to the invention. On the horizontal axis we can see both the current limit and the maximum short-circuit current according to the invention to which the current is restricted in a short-circuit situation. $V_{FM}$ is the forward voltage drop of the diode connected in parallel with the switching transistor.

Figure 3:
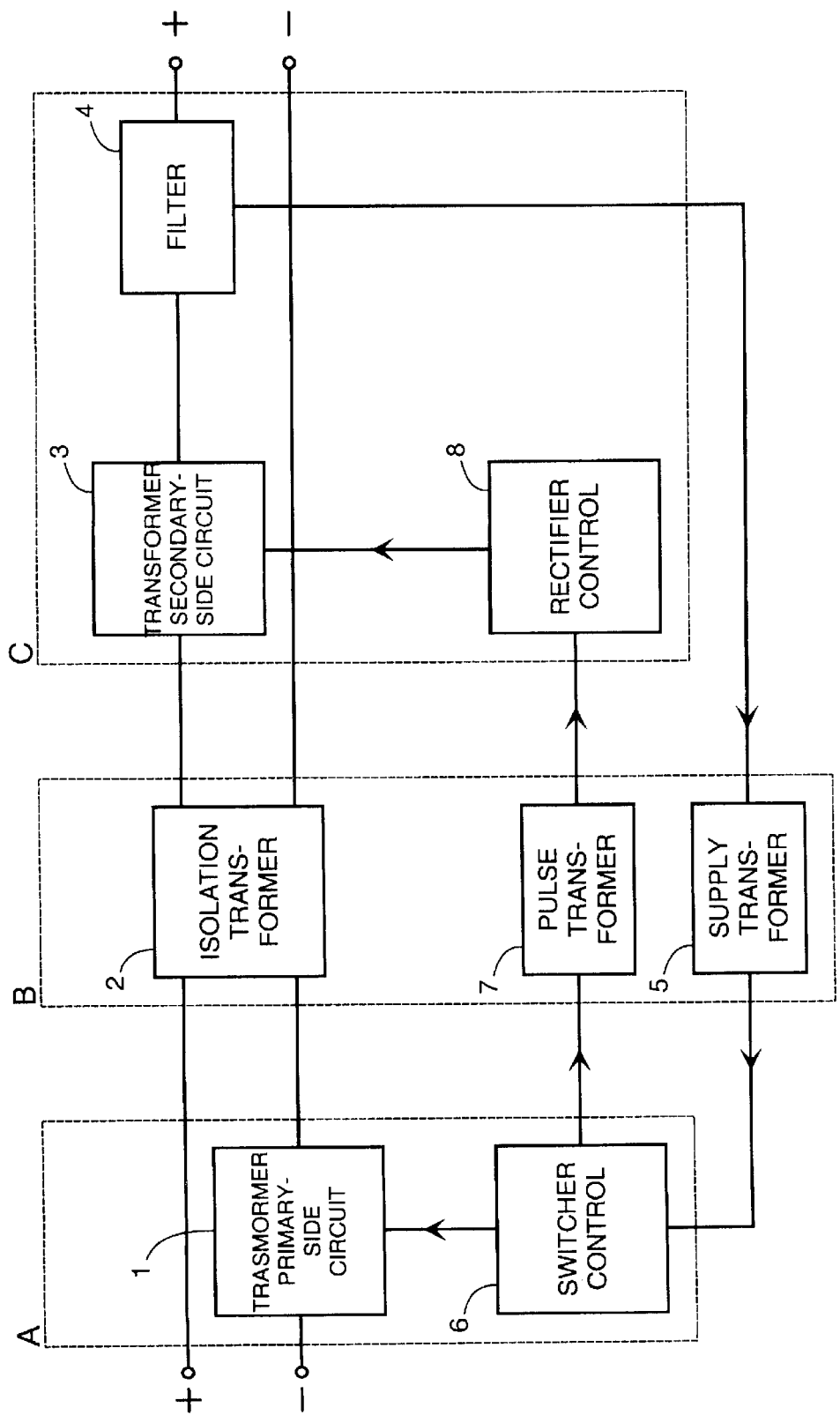
FIG. 3 shows a block diagram of a power source circuit according to an embodiment of the invention.

FIG. 3 shows a block diagram of a DC—DC power source applying the idea of the invention. Depicted in the figure is a transformer primary circuit 1, isolation transformer 2, transformer secondary circuit 3, filter 4 for rectified current and, further, a supply transformer 5 for rectification control, switcher control unit 6, pulse transformer 7, and a rectifier control unit 8. Voltage information is conducted from the filter 4 by the supply transformer 5 for the switcher control unit in such a manner that in a short-circuit situation the pulse transformer 7 turns off the rectifier control unit 8. The figure further shows, defined in broken lines, the primary-side switch block A, transformer unit B, and rectifier C. The primary-side switch block A comprises the primary circuit 1 and switcher control unit 6. The transformer unit B comprises the isolation transformer 2, pulse transformer 7 and in this case the supply transformer 5. The supply transformer 5 may also be divided between the rectifier C and primary-side switch block A so that the first coil or the main coil is in the rectifier C and the secondary coil is in the primary-side switch block A. The rectifier C comprises the transformer secondary circuit 3, filter 4, and rectifier control 8. In accordance with the invention the transformer secondary circuit 3 here comprises, apart from the switching transistors controlled by the rectifier control unit 8, second switch elements, such as diodes, connected in parallel with the switching transistors.

Figure 4:
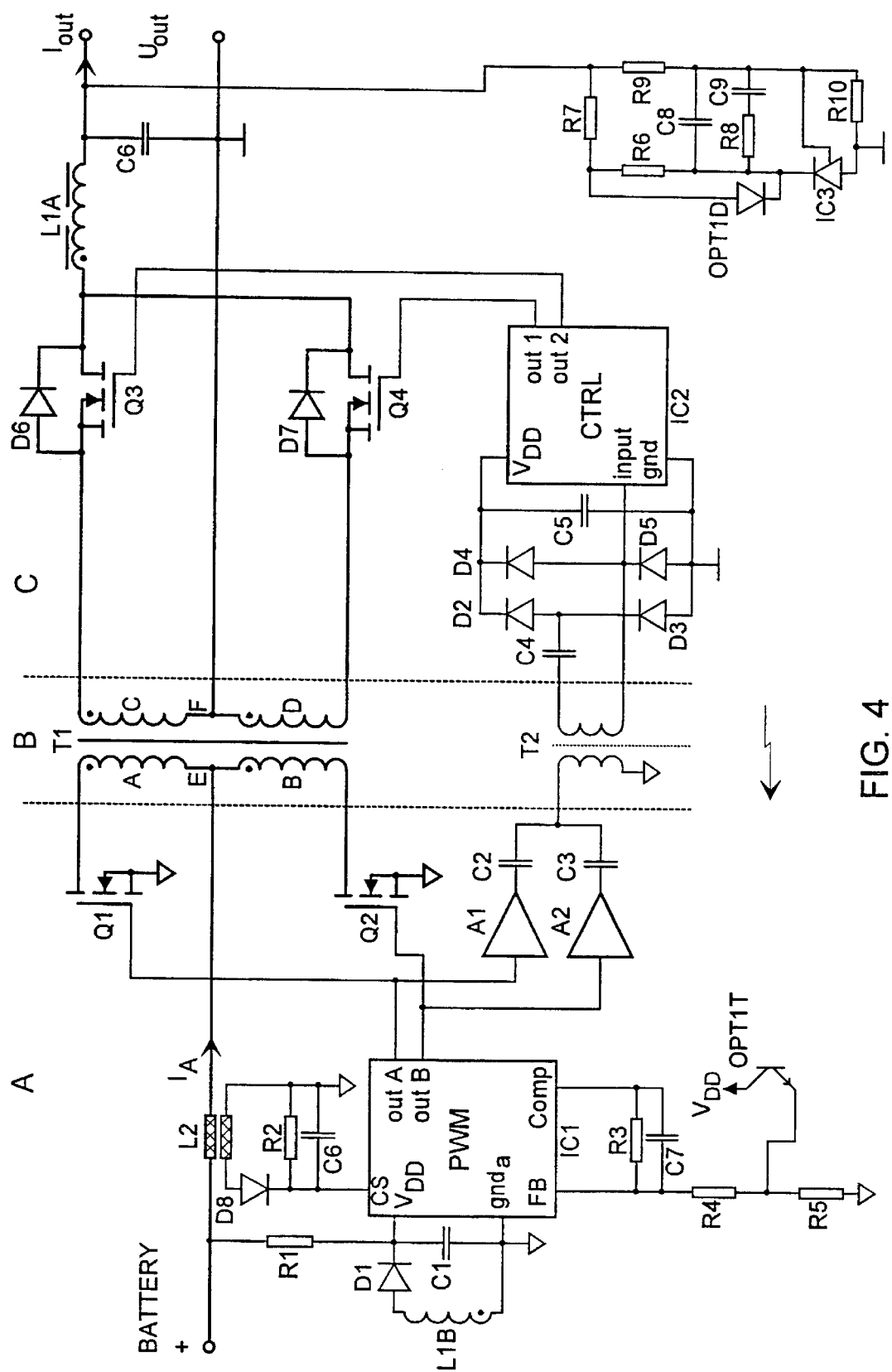
FIG. 4 shows a circuit diagram of a power source circuit according to an embodiment of the invention.

FIG. 4 shows a circuit diagram of a DC—DC power source applying the idea of the invention. An inductor coil L1 is used to produce an operating voltage $V_{DD}$ for the element generating the control signal, i.e. in this exemplary embodiment a pulse-width modulator (PWM) IC1, which voltage is proportional to the power source output signal which in this exemplary embodiment is the output voltage. The main part L1A of the coil L1 is connected to the rectifier output line, and the second part L1B is connected to the operating voltage circuit of the pulse-forming part, i.e. in this exemplary embodiment, the pulse-width modulator IC1. In this exemplary embodiment the operating voltage circuit comprises a diode D1 and capacitor C1 to rectify the voltage. The operating voltage $V_{DD}$ thus produced varies in proportion to the rectifier output signal and affects the pulse heights of the pulses of the pulse-width modulator IC1 and, further, through the pulse-width modulator outputs out A, out B, the operating voltage of the switch circuit IC2 so that when the power limit of the rectifier C is exceeded and the operating voltage drops, the switch circuit IC2 ceases to operate. Switching transistors Q1, Q2 are used to alternately connect the halves A, B, respectively, of the isolation transformer T1 to a first ground $gnd_a$ and, thus, to the negative terminal of the batteries. The center point E of the primary winding is connected to the positive terminal of the batteries. The turn-on current of the pulse-width modulator IC1 is brought from the battery line through resistor R1.

The primary-side switch block A and rectifier C in the power source are galvanically isolated by means of an air gap in the transformer unit's isolation transformer T1, pulse transformer T2 and opto-coupler OPT1.

In this exemplary embodiment the power source comprises an arrangement by means of which the control unit switch circuit IC2 gets both the operating voltage and the control information from the control line of the switching transistors Q1, Q2 through amplifiers A1, A2, capacitors C2, C3 and pulse transformer T2 grounded at one end of the winding. From the secondary winding of the pulse transformer T2, through capacitor C4, diode rectifier D2, D3, D4, D5 and filter capacitor C5, the switch circuit gets both the operating voltage at inputs $V_{DD}$ and gnd and the control information at the input marked 'input'. Based on the stepping of the operating voltage and control information the outputs out 1, out 2 are alternately activated so that the power source's secondary-side transistors Q3, Q4 always connect to the rectifier output that side C, D of the isolation transformer T1 which has the same polarity. However, the operation of the switch circuit IC2, i.e. the activation of outputs out 1, out 2, is stopped if the operating voltage drops below the operating limit when the power source output voltage has dropped in an overload situation. The center point F of the secondary winding is both grounded to the second ground potential gnd and connected so as to be the negative output of the power source. In addition, there are here, in parallel with both switching transistors Q3, Q4, second switch elements which in this exemplary embodiment are forward-biased (with respect to rectification) diodes D6, D7 which in a short-circuit situation, when the control to the switching transistors Q3, Q4 ceases, provide current to the switching element L1A for the pulse-width modulator IC1 so that normal operation can be restored after the short-circuit is removed. Furthermore, in parallel with the output there is a filter capacitor C6 which provides a d.c. voltage $U_{out}$. It is obvious to a person skilled in the art that the said second switch elements may also be other suitable components than diodes D6, D7.

The turn-on and turn-off levels of the switch circuit IC2 determine the hysteresis of the overall operation. The turn-on level is e.g. 12.5 volts and the turn-off level e.g. 8.3 volts. A power source in a short-circuit state returns to normal operation only after the short-circuit has been clearly removed.

Moreover, FIG. 4 shows how the pulse-forming part IC1 in the primary-side switch block A is also controlled on the basis of the primary current intensity by means of an inductor coil L2. A control voltage is rectified for pulsed current $I_A$ by means of a diode D8, resistor R2 and capacitor C6. The control voltage is fed to the current-sensing input CS of the pulse-width modulator IC1. The control for the pulse-forming part IC1 based on the primary current IA affects the pulse width in such a manner that when the current increases too much, the pulses are made narrower in order to restrict the current.

Furthermore, FIG. 4 shows opto-isolated feedback proportional to the output voltage $U_{out}$ of the rectifier C for controlling the pulse-forming part IC1 in the primary-side switch block A. The output signal of the rectifier C, i.e. in this exemplary example, the output voltage $U_{out}$ is connected to resistor R6, R7, R8, R9, R10, voltage reference circuit IC3 and, through a capacitor connection C8, C9, to an opto-coupler OPT1. Light emitted by a light-emitting diode OPT1D in the opto-coupler is sensed by a phototransistor OPT1T and conducted to the feedback FB and comparator Comp inputs of the pulse-width modulator IC1 through a circuit element comprising resistors R3, R4, R5 and capacitor C7. The control for the pulse-forming part IC1 based on the output voltage $U_{out}$ of the rectifier C affects the pulse width so that when a pulse is detected at the output of the rectifier C the pulse started by the pulse-width modulator IC1 is cut off and thus shortened.

Figure 5:
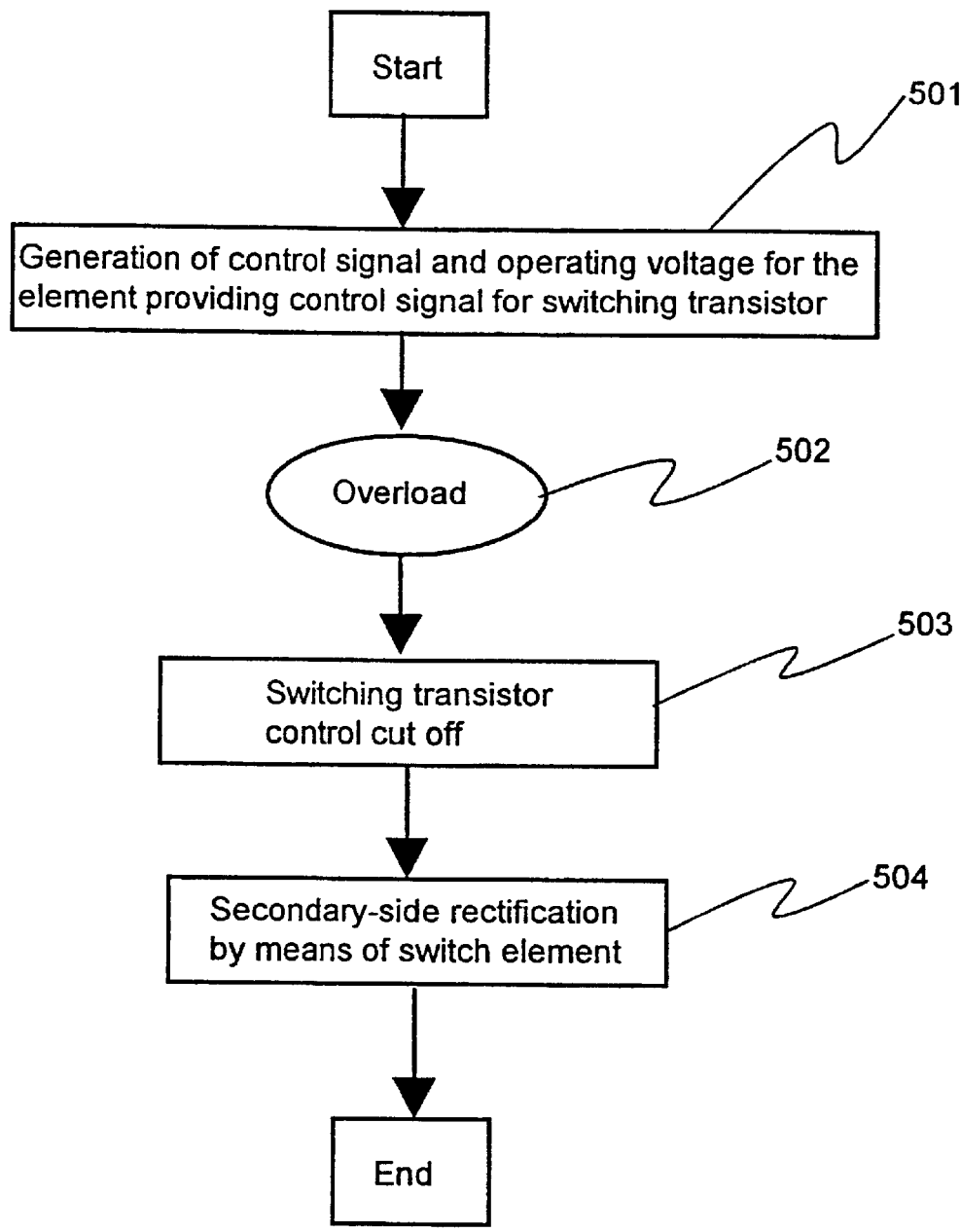
FIG. 5 shows a flow diagram of the method according to the invention.

FIG. 5 shows by way of example a flow diagram of the method according to the invention for restricting a short-circuit current. In the first step 501, the secondary-side switching transistors Q3, Q4 are controlled by the switch circuit IC2. The switch circuit IC2 gets its control from the circuit generating the control signal. The circuit generating the control signal is controlled according to its operating voltage which is at least partly proportional to the power source output signal. Thus the control signal generated by the circuit is generated at least partly on the basis of the power source output signal. In an overload situation 502, in this exemplary embodiment, the control for the secondary-side switching transistors Q3, Q4 is cut off 503 and the secondary-side rectification is realized 504 substantially by means of switch elements connected in parallel with the secondary-side switching transistors. It is obvious to a person skilled in the art that the method according to the invention may be realized in some other way than that described above.

Above it was described a push-pull type power source, but the invention is applicable to other types of power source as well.

As an example, let us consider the restriction of a short-circuit current and the return of normal status when installing a live unit in a telephone exchange or the like. The battery voltage is in this case 48 volts, for example. The power source is energized, i.e. live. As a short-circuit occurs, the current $I_{out}$ provided by the power source rises above the load current limit and the output voltage $U_{out}$ drops, causing the pulse voltage in the pulse-width modulator IC1 to drop and the operating voltage $V_{DD}$ of the switch circuit IC2 to drop below the operating limit, whereby the activation of the switching transistors Q3, Q4 in the rectifier is halted. However, the current flowing through diodes D6, D7 keeps the switch element L1A, L1B active. Moreover, the current-sensing circuit CS for the primary current IA and the feed-back FB of the output voltage $U_{out}$ of the rectifier C decrease the pulse width. When the short-circuit is noticed and the unit is moved to its correct position, the voltage conducted by the switch element L1A, L1B rises and the switch circuit IC2 is turned on again and normal synchronous operation at secondary-side switching transistors Q3, Q4 is resumed.

This way, the current $I_{out}$ is restricted during a short-circuit to the circuit comprised of the primary-side switching transistor switched on by a pulse from the pulse-width modulator IC1 of the primary-side switch block A, the isolation transformer and rectifier diodes D6, D7 in the forward direction at the secondary side.

When the output of the rectifier C is off, the variable-amplitude voltage from the isolation transformer T1 and capacitor C6 produce a voltage across the inductor coil L1A.

The switching transistor is usually a field effect transistor (FET). The pulse-width modulator IC1 and the switch circuit IC2 may be realized using ready-made microchips, such as the Unitrode UCC3808, for instance.

The invention is best applied to equipment in which the power levels exceed 20 W, whereby the power consumed by the control circuitry is smaller than the benefit achieved.

It is obvious to a person skilled in the art that while only one preferred embodiment according to the invention was described above, the idea of the invention here presented can be applied in a similar fashion to other power source arrangements as well. In general, the invention can be applied within the scope of the idea of the invention defined by the claims attached hereto.

What is claimed is:

1. A power source with an arrangement for restricting a short-circuit current, said power source comprising:
   a primary-side switch block,
   a transformer unit having a transformer primary side and a transformer secondary side, said primary-side switch block connected to said transformer primary side, and
   a rectifier connected to said transformer secondary side for generating an output signal of the power source and having at least one switching transistor, a rectifier switching circuit for controlling said at least one switching transistor, wherein said rectifier switching circuit is arranged to be cut off in an overload situation, and at least one switch element connected in parallel with said at least one switching transistor, whereby rectification at the secondary side is realized in an overload situation by said at least one switch element,
   wherein said primary-side switch block includes a pulse-forming part for controlling the primary-side switch block and for generating a control signal proportional to the output signal of the power source and an arrangement for feeding the control signal from said pulse forming part to said rectifier switching circuit, said rectifier switching circuit controlling said at least one switching transistor in response to the control signal generated by said pulse-forming part.

2. A power source according to claim 1, wherein said at least one switch element is a diode.

3. A power source according to claim 1, wherein said pulse forming part includes means for receiving an operating voltage, said arrangement for delivering a control signal is connected for feeding the operating voltage to said rectifier switching circuit.

4. A power source according to claim 3, further comprising an output signal element arranged to generate a signal, which is at least partly proportional to the power source output signal, and connect the signal to the pulse-forming part.

5. A power source according to claim 4, wherein said output signal element comprises and induction coil having a main coil connected for conducting a current of said output signal, and a secondary coil connected to a circuit generating the operating voltage circuit of said pulse-forming part.

6. A power source according to claim 4, wherein said arrangement for feeding the control signal further comprises means for feeding the operating voltage to said rectifier switching circuit, wherein the operating voltage is based at least partly on the signal which is at least partly proportional to the power source output signal.

7. A power source according to claim 4, wherein the signal which is at least partly proportional to the power source output signal is at least partly proportional to the magnitude of the power source output current.

8. A method for restricting the short-circuit current of a power source comprising a primary-side switch block including a pulse forming part for control thereof, transformer unit having a primary side and a secondary side, the primary-side switch block being connected to the primary side of the transformer, and a rectifier including at least one switching transistor, the rectifier being connected to the secondary side of the transformer and including at least one switch element connected parallel with the at least one switching transistor, and a rectifier switching circuit for controlling the at least one switching transistor, said method comprising the steps of:

producing, by the pulse forming part, a control signal proportional to an output signal of the rectifier;

delivering the control signal from the pulse forming part to the rectifier switching circuit;

controlling the at least one switching transistor, by the rectifier switching circuit, in response to the control signal;

cutting off control, by the rectifier switching circuit, of the at least one switching transistor in an overload situation of the power source; and rectifying the secondary side of the transformer using the at least one switch element in the overload situation.

9. A method according to claim 8, wherein the pulse forming part receives an operating voltage and said step of delivering the control signal further includes delivering the operating voltage from the pulse forming part to the rectifier switching circuit.

* * * * *